(12) United States Patent
Tzavidas et al.

(10) Patent No.: US 7,702,289 B2
(45) Date of Patent: Apr. 20, 2010

(54) FAST ACQUISITION OF A COMMUNICATION UPLINK ALLOCATION IN A MOBILE COMMUNICATION SYSTEM BASED ON MOBILE PROCESSING CAPABILITIES

(75) Inventors: Stavros Tzavidas, Evanston, IL (US); Pieter-Paul S. Giesberts, Den Haag (NL)

(73) Assignee: Motorola, Inc., Schaumburg, IL (US)

( * ) Notice: Subject to any disclaimer, the term of this patent is extended or adjusted under 35 U.S.C. 154(b) by 944 days.

(21) Appl. No.: 11/458,454

(22) Filed: Jul. 19, 2006

(65) Prior Publication Data

US 2007/0026881 A1 Feb. 1, 2007

Related U.S. Application Data

(60) Provisional application No. 60/701,184, filed on Jul. 21, 2005.

(51) Int. Cl.
*H04B 1/00* (2006.01)
*H04W 72/12* (2009.01)

(52) U.S. Cl. .................. 455/69; 455/517; 455/67.11; 455/450

(58) Field of Classification Search ............... None
See application file for complete search history.

(56) References Cited

U.S. PATENT DOCUMENTS

| | | | |
|---|---|---|---|
| 5,923,650 A * | 7/1999 | Chen et al. ............ 370/331 |
| 6,463,283 B2 | 10/2002 | Achour et al. |
| 6,654,602 B1 | 11/2003 | Fye et al. |
| 2003/0211848 A1 | 11/2003 | Rajkotia et al. |
| 2004/0185853 A1 | 9/2004 | Kim et al. |
| 2005/0075108 A1 | 4/2005 | Cho et al. |
| 2005/0096051 A1 | 5/2005 | Lee et al. |
| 2005/0101328 A1 | 5/2005 | Son et al. |
| 2005/0117539 A1 | 6/2005 | Song et al. |
| 2005/0220040 A1 * | 10/2005 | Petrovic et al. ........ 370/278 |

OTHER PUBLICATIONS

IEEE C802.16e-05/214r5, IEEE 802.16 Broadband Wireless Access Working Group <http://ieee802.org/16>, "Clarification for HO section", May 3, 2005, pp. 1-9.
Draft IEEE Standard for Local and metropolitan area networks, Part 16: Air Interface for Fixed and Mobile Broadband Wireless Access Systems, Amendment for Physical and Medium Access Control Layers for Combined Fixed and Mobile Operation in Licensed Bands, IEEE P802.16e/D9, Jun. 2005, Jun. 27, 2005, pp. 1-7, 40-41, 518-520.

* cited by examiner

*Primary Examiner*—Philip J Sobutka
(74) *Attorney, Agent, or Firm*—Brian M. Mancini

(57) ABSTRACT

A system and method for fast acquisition of a communication link in a wireless broadband communication system between a mobile station and a base station includes a scheduler (100) that is informed (102) of the processing capabilities of the mobile station, preferably in an optional message field. The scheduler determines (104) a time that the mobile station can respond to a downlink message, in the same frame or in a subsequent frame, using the processing capabilities. The scheduler allocates (106) uplink bandwidth for the mobile station to respond to the downlink message at the determined time. In this way, upon sending (108) a message from the base station to the mobile station, the mobile station can immediately respond (112) at the allocated time without having to perform an explicit bandwidth request. As a result, link entry and/or handover times are reduced.

18 Claims, 6 Drawing Sheets

FAST ACQUISITION OF A COMMUNICATION UPLINK ALLOCATION IN A MOBILE COMMUNICATION SYSTEM BASED ON MOBILE PROCESSING CAPABILITIES

FIELD OF THE INVENTION

The present invention relates generally to a mobile communication system and in particular to fast acquisition of a communication link in a mobile communication system.

BACKGROUND OF THE INVENTION

Demand for wireless broadband access communication is trending upwards. Such systems include Local Area Network (LAN) systems and Metropolitan Area Network (MAN) systems, for example. Although new wireless systems are continually being developed, such as IEEE 802.16 wireless broadband communication systems, the amount of frequency spectrum is limited within each system while demands for increased Quality of Service (QoS) increase. As a result, more and more users are driven to use a fixed amount of bandwidth with a given quality level in any particular broadband system. This results in congestion and subsequently problems in communication latency in obtaining a communication link when entering the system. This problem is compounded for mobile communication systems, wherein a mobile station moving between cells of a broadband system will require communication overhead to deal with handovers between base stations, which interrupts communication traffic for new link acquisition procedures, resulting in even further delay or latency issues.

Specifically, during network entry and/or handover conditions in IEEE 802.16 communication systems a Mobile Station (MS) exchanges a number of Media Access Control (MAC) Management Messages with a Base Station (BS). These messages form a series of Request/Reply pairs, i.e. the MS receives a downlink messages and, as a result, generates a reply message in the uplink direction. In order to send uplink messages to the BS, the MS needs to be allocated uplink transmission opportunities by the scheduler, which resides in the BS. Scheduling decisions are made and communicated to an MS connected with a BS in time segments called frames. The size of a frame in IEEE 802.16 is variable and can range from two to twenty milliseconds. Communication resources for uplink transmissions (from the MS to the BS), can be either allocated by the scheduler unilaterally or upon the MS's request. The MS requests uplink communication resources by following a process called "Uplink Bandwidth Request" and which can take several frames to complete.

One of the factors that can significantly affect the delay associated with a communication link entry/handover is the processing speed of the MS. When the MS is able to process the messages it receives and reply to the BS faster, the overall delay could be minimized. Currently, there exists no means of the MS indicating its processing capabilities to the BS so in general the scheduler assumes that the earliest an MS can respond to a message it receives in a particular frame, is at the next frame.

Referring to FIG. 1, a base station has no knowledge of the processing power of an MS. Therefore, the BS sends (1) a downlink message to the MS and typically assumes that the MS will not be able to reply before the next frame. The MS receives the downlink message and prepares a reply message (2). The time at which the reply will be ready largely depends on its processing power. An MS may have fast processing power and finish processing the downlink message (2) and be ready to reply to the message well before the end of the present frame. However, before the MS can send the uplink message to the BS, it needs to obtain uplink communication resources. For this purpose, the MS will either perform an Uplink Bandwidth Request (which will take several frames) or alternatively the BS can allocate uplink bandwidth for the MS in an unsolicited manner, trying to predict when the MS will be ready to reply. In the situation depicted in FIG. 1 the MS has finished processing the downlink message before the end of frame, but the BS has only allocated an uplink transmission opportunity in the next frame. In general, the unsolicited uplink transmission opportunity can appear in even later frames, thus further increasing the overall delay. Once the uplink transmission opportunity appears the MS can then send the reply message (3). In the situation described here, the BS only predicts processing time without input from MS. The prediction can be inaccurate quite often, especially during network entry when not enough samples of the MS's response time are available, resulting in a too conservative prediction.

As a result, each Request/Reply pair of messages takes at least two, and possibly more, frames to be completed, even though in some cases the MS can process incoming messages and reply much earlier than the beginning of the next frame. Furthermore, the processing time at the MS can be prolonged if more messages are addressed to the MS in a particular frame (e.g. Downlink Messages 2 and 3 in FIG. 2). This is because the MS will need to decode more messages in the present frame wherein the processing power is consumed for processing the newly arrived messages, thus preventing the MS from replying fast enough.

One solution is to provide vendor specific information fields to convey the MS processing capacity to the BS. However these fields are included in messages that appear much later in the network entry process, and thus the amount of time that can be saved in limited. Also, in this case, the proposed optimizations can only be implemented when BS and MS are manufactured by the same vendor.

Therefore, a need exists for a method and apparatus that reduces the amount of latency and delay in wireless broadband communication systems, particularly in communication link entry/handover procedures. It would also be an advantage to allow Request/Reply pair messages to occur within one frame. It would also be of value to provide the BS with an indication of the processing capabilities of the MSs connected with it, so that it can differentiate between faster and slower ones, even in the case that Request/Reply pair messages cannot occur within one frame for all MSs. It would also be of benefit if the prolongation of processing time, due to additional messaging could be addressed.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

Figure 1:
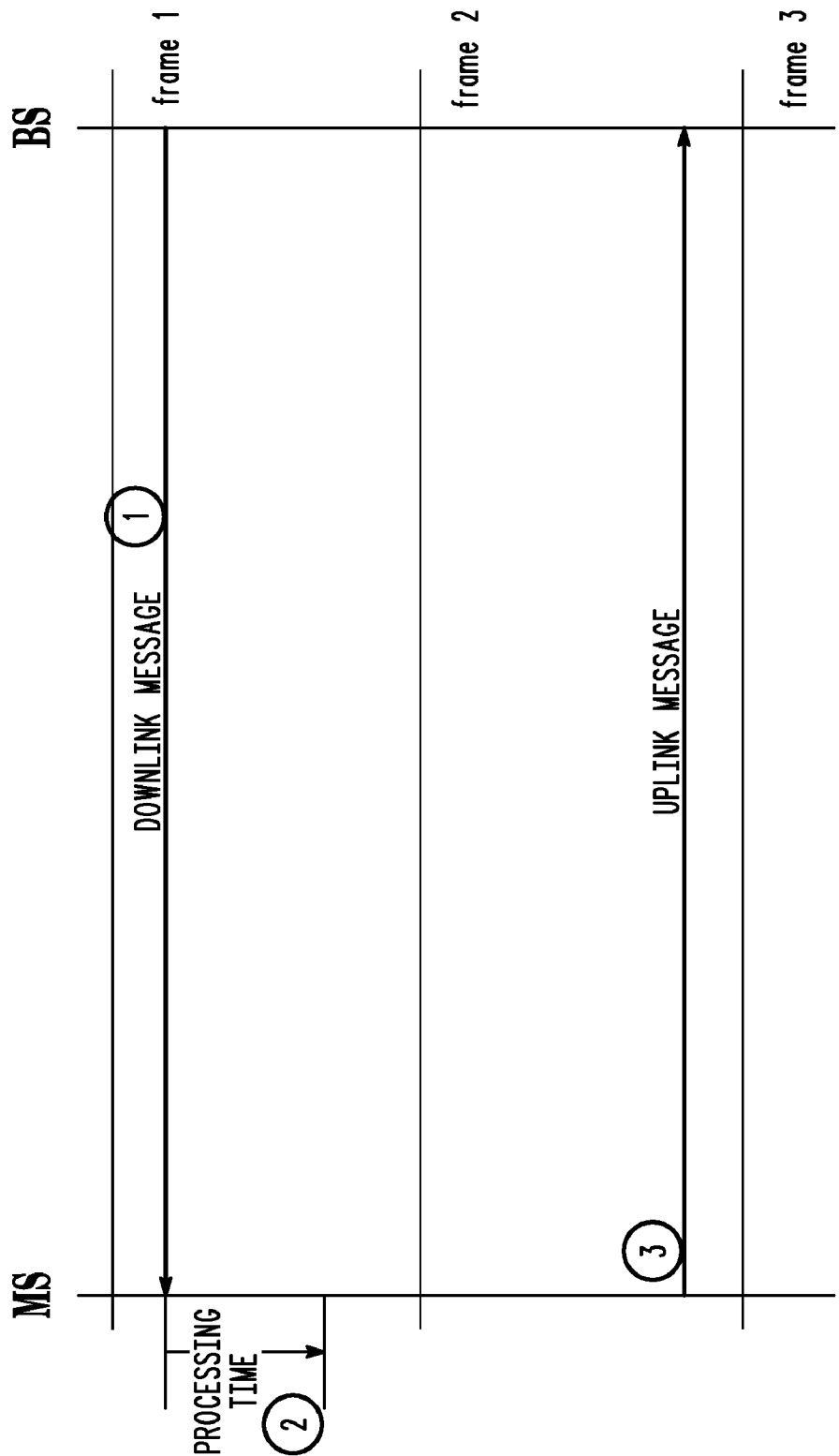
FIG. 1 shows a simplified timing diagram of existing Request/Reply pair messaging in current 802.16 communication systems.
Figure 2:
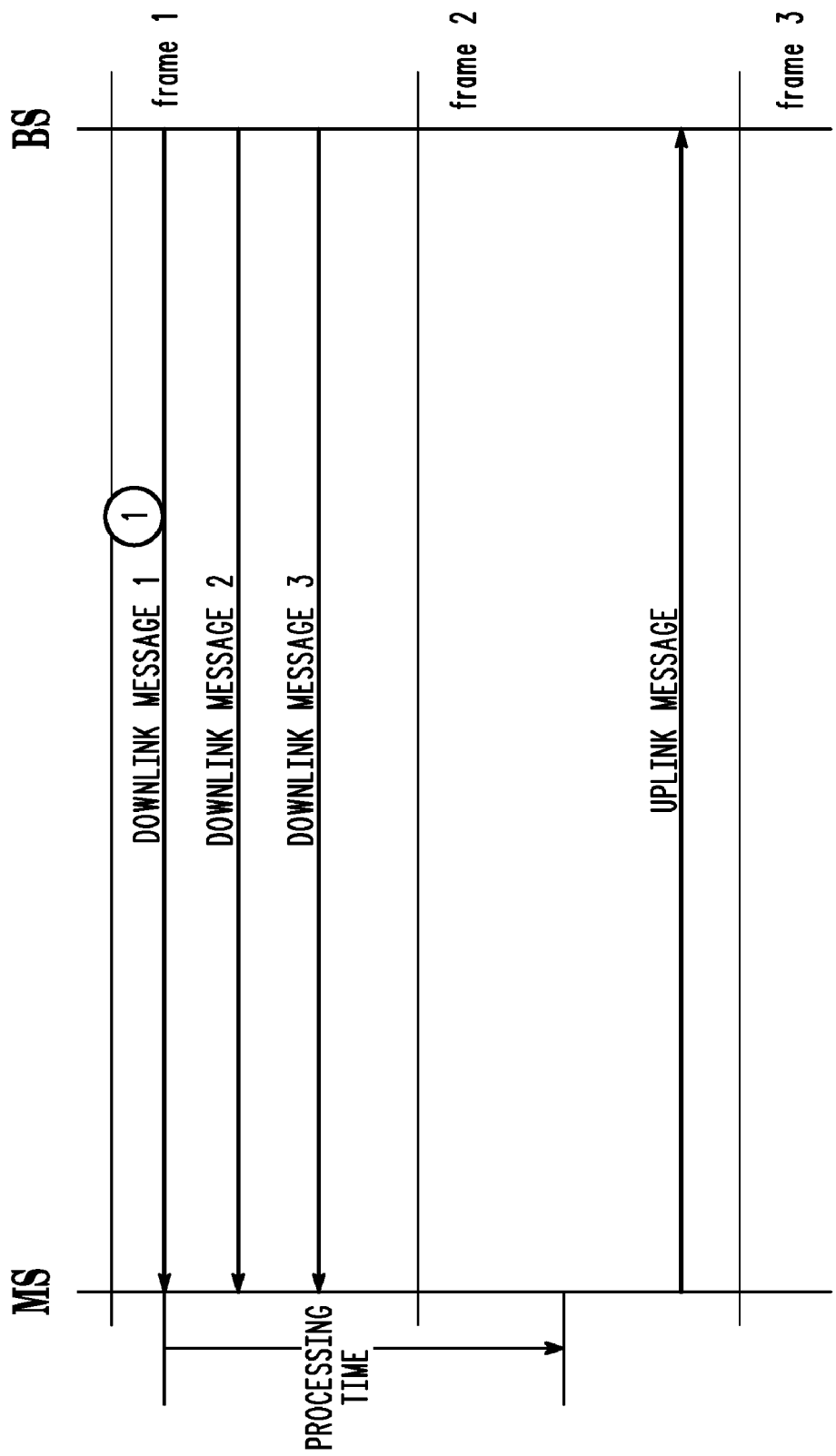
FIG. 2 shows a simplified timing diagram of the communications of FIG. 1 with additional messaging.

The present invention provides a method and apparatus that reduces the amount of latency and delay in wireless broadband communication systems, particularly in communication link entry/handover procedures. In particular, the present invention allows Request/Reply pair messages to occur within one frame when the processing power of a mobile station allows it. In the more general case, the present invention allows resources for Reply messages to be allocated at the exact time they are needed, even in the case that Request/Reply pair messages cannot occur within one frame for all MSs. In this way, the BS can differentiate between faster and slower MSs and prioritize uplink bandwidth. The present invention also addresses the prolongation of processing time, due to additional messaging, by ensuring a period of messaging silence, as will be detailed below. These two techniques can each allow more efficient utilization of uplink bandwidth resources and also can help speed up network entry for mobile stations with faster processors.

In particular, the present invention provides a communication system for fast acquisition of a wireless broadband communication link in a communication system between a mobile station and a base station. The communication system includes information indicating the processing capabilities of the mobile station. A scheduler is operable to receive the information and determine a time in a selected frame that the mobile station can respond to a downlink message. The scheduler can reside internally at the BS or some other network entity over the network backbone. The scheduler allocates uplink bandwidth in the selected frame for the mobile station to respond to the downlink message at the determined time. When a message is sent from the base station to the mobile station in the frame, the mobile station can respond to the message at the allocated time, which can be before the end of the same frame, if the processing capabilities of the mobile station permit.

In a first embodiment, the scheduler, which can be located in a Base Station (BS) as in the examples below (see FIGS. 3 and 4), or other linked network entity, is informed of the processing capabilities of a Mobile Station (MS). Using that information the scheduler can determine the earliest time that the MS will be able to respond to a message that it receives, and thus allocate uplink bandwidth for the MS at the exact time that is needed. This embodiment requires a modification in the contents of the initial network entry control messages (i.e. MAC Management Messages such as RNG_REQ, RNG_RSP), to include optional control message fields which the MS can use to indicate its processing capabilities. The scheduler is operable to receive the informing of the processing capabilities of the mobile station by reading the optional field attached to the existing control message, specifically a TLV field attached to a Media Access Control management message indicating the processing capability of the mobile station.

Alternatively or additionally, in a second embodiment, the scheduler can ensure that the MS will not be disturbed while processing the downlink message, for example by making sure that there are no other messages scheduled for the MS until the expected reply time. In other words, the scheduler operates to ensure that the mobile station will not be disturbed with another scheduled message before the mobile station can respond, such that the mobile station can respond to the downlink message within the determined time. In this way, the scheduler expedites a response from the MS, by imposing "silence intervals", during which the MS does not have to decode other messages while processing the incoming message. This can be accomplished through an optional control message flag which the MS can use to indicate to the BS if silence intervals are desired or not. Regardless of the MS's indication the BS can decide to impose silence intervals at will.

Figure 3:
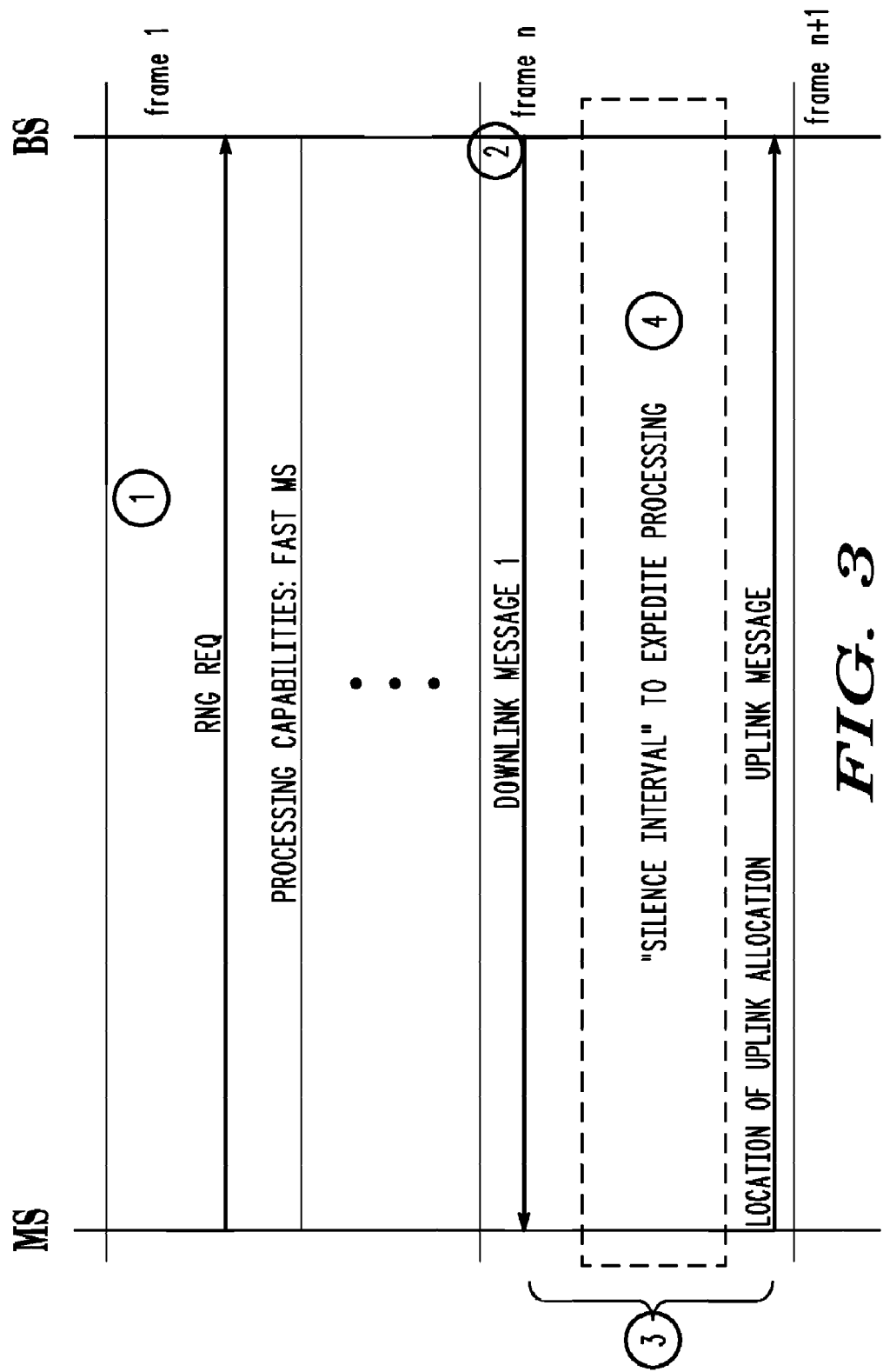
FIG. 3 shows a simplified timing diagram of communication, in accordance with the present invention.
Figure 4:
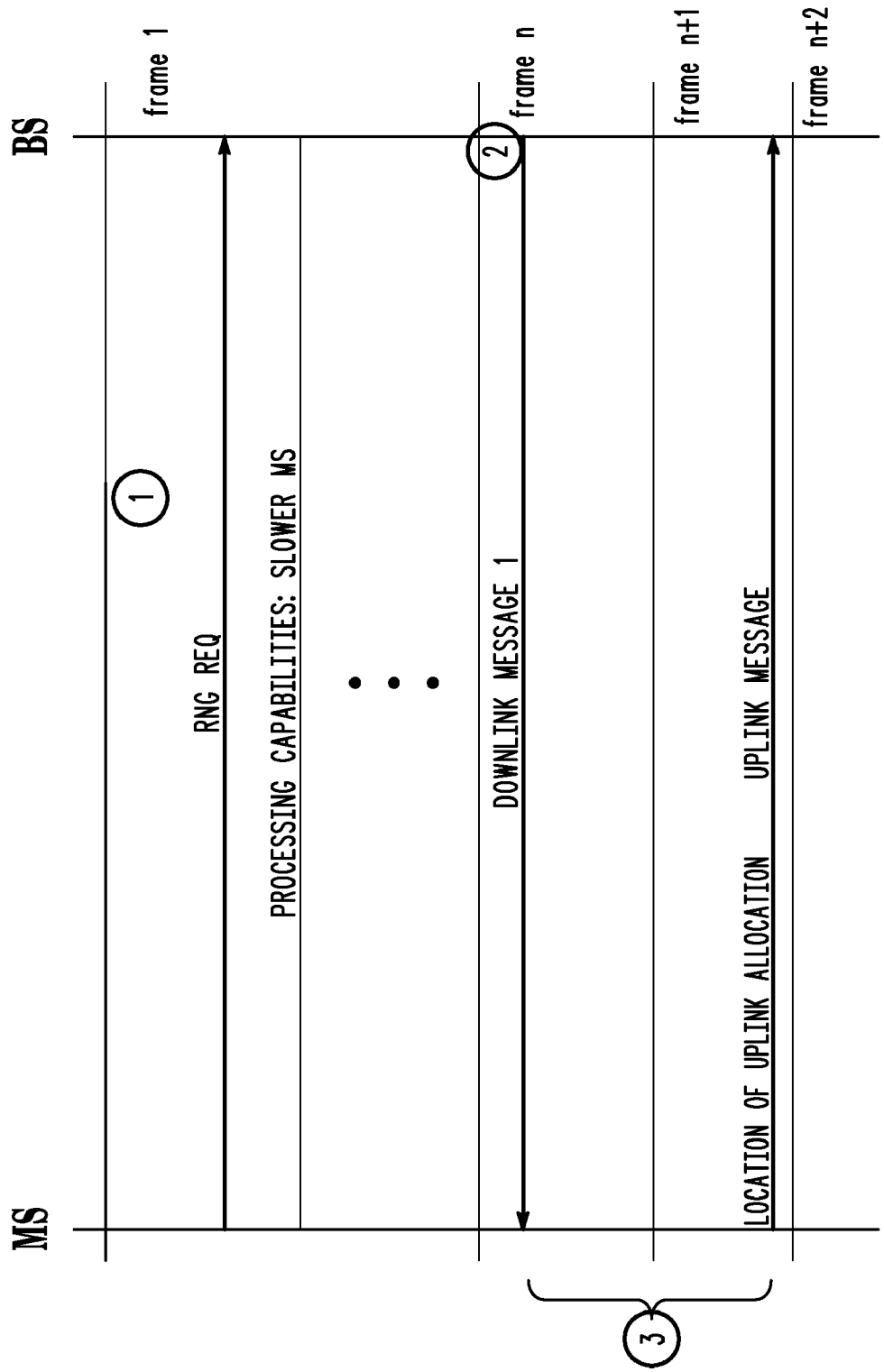
FIG. 4 also shows a simplified timing diagram of communication, in accordance with the present invention.

Referring to FIGS. 3 and 4, in accordance with the first embodiment the MS communicates its processing capabilities to the BS after it synchronizes to the frame structure of the BS. In particular, this can be done by including its processing capability (1) in the early MAC management control messages (e.g. in RNG_REQ, as shown in the figure). The processing capability may indicate that the MS is fast enough (FIG. 3) to be able to reply to a message within one frame or that the MS is slower (FIG. 4) and only able to reply to a message in subsequent frames. Specifically, the processing capability can be included in a "Type, Length, Value" (TLV) triplet, as an optional field at the end of the control message, which can easily be added or removed. For example, the "value" field can contain the processing capability (e.g. bytes/millisecond processor speed among other parameters) of the MS. The "type" field defines what type of information is included and the "length" field defines the length of the information in bytes. Using TLVs, the message can be decoded by the scheduler "on the fly". In other words, the contents of the TLV field are not pre-determined, but the scheduler can determine what comes next in the field and how big it is by looking at the type and length fields.

It should be recognized that there are many parameters involved with the defined "processing capability" of the MS. The scheduler needs to be informed about the =effect of all the factors that can affect the response time of a mobile station, and are related to the way the mobile is built (e.g. software architecture, speed of processor on board, order of operations, amount of memory available, etc.). In practice, the MS is not asked to provide specific descriptions of its components (since this would be not very useful), but the MS will provide estimates of processing times and processing speed capabilities for specific operations. For example, the MS can provide an estimate of its processing power for operations that depend on the size of a MAC Management Message. For instance, the MS can provide a bytes/millisecond value for MS message encryption/decryption, which defines how fast a certain layer can decode or encode MAC management messages based on their size. Further, absolute delay estimates can be indicated by the MS, for delays associated with higher layers, where the primary consideration is not the size of the MAC management message but the type of information it contains. For these parameters a TLV can be sent that tells the scheduler either an exact processing time for downlink messages or that a time guardband is needed to reply. In the latter, the scheduler will provide extra time for the MS to complete its uplink reply transmission.

In operation, any information provided by the MS can include a minimum delay, exact delay, or maximum delay before the MS can provide an uplink response. A minimum delay is the earliest that the MS could finish processing the downlink message, before responding. The exact delay is the exact time that the MS could finish processing the downlink message, given its present processing load, before responding. A maximum delay is a promised time where the MS will complete the processing of the downlink message before responding, wherein the MS will assign priorities as needed to complete the downlink message processing. In all cases the MS can specify weather the delay estimates are provided under the assumption that the MS will be allowed to process the incoming downlink management message without interruptions.

When the base station sends a downlink message (2), the scheduler can calculate how soon it can expect an uplink message reply to that downlink message based upon the processing power of the MS. If the processing capability of the MS indicates that a reply uplink message is expected within that frame (FIG. 3), then the BS makes sure that there is enough time (3) between the downlink message and the uplink allocation for the MS to process the downlink message. If the processing capability of the MS indicates that a reply uplink message is expected within a subsequent frame (FIG. 4), then the BS schedules the uplink allocation for the MS to process the downlink message in the subsequent frame at the time they are needed. Optionally, the scheduler makes sure to not schedule any other downlink messages to the MS during the period (4) when it is processing the downlink message. This so-called "Silence Interval" ensures that the MS is not interrupted and has time to decode and process the downlink message and reply.

The scheduler will make use of the processing capabilities information it receives from the MS in three following ways:

Firstly, if an MS is capable of processing a message and replying within the duration of a single frame, whenever a downlink message is scheduled, the scheduler also allocates uplink bandwidth for the MS in the same frame. In particular, the MS provides a detailed estimate of the processing time required for various MAC Management Messages involved in the network entry process. In essence, the MS provides estimates of how long it will take for it to respond to various messages. It also indicates whether these estimates should be used for uplink bandwidth allocation or they are provided purely for comparison purposes. The BS will use the information provided by the MS in order to accurately predict or determine the time at which uplink bandwidth will be needed by the MS. It should be noted that mobile stations that indicate slower processing capabilities may not be able to respond within the same frame. For these mobile stations, uplink transmission opportunities are assigned at the time they are needed, within a later frame, as shown in FIG. 4.

Secondly, the scheduler makes an effort to allow as much time as possible within a frame for the MS to process the incoming messages. In other words the scheduler makes sure that the downlink message is sent to the MS as early as possible in the frame, and that the uplink allocation for the reply message appears as late as possible (or as late as needed) in the frame. The same technique can also be applied in the cases where the downlink message and the uplink bandwidth allocation occur in different frames, to allow as much time as possible for the MS to respond.

Thirdly, the scheduler makes sure that the MS does not need to decode any messages between the time it receives the downlink management message until the allocated time for the uplink bandwidth for the response, in order to allow the MS to quickly process the message. The BS will use the processing capability information provided by the MS in order to accurately determine the time at which uplink bandwidth will be needed by the MS, and, if required, it will impose silence intervals until that time, in order to expedite the MS response. An additional flag can be used to indicate whether the provided estimates assume that "silence intervals" are imposed. In making the decision of weather to impose silence intervals the scheduler can take into account the mobile's indication of whether this is desired or not.

The main factors that affect the MS's response time, with respect to MAC Management messages are the following:

1. Forward Error Correction (FEC) decoding/encoding: the time taken to parse an incoming message depends on the particular FEC scheme that is at use (indicated by the DIUC) and also on the size of the incoming message. Similarly the time taken to prepare an outgoing message depends on the particular FEC scheme that is at use and also on the size of the outgoing message.
2. Cyclic Redundancy Code (CRC) check/calculation: mostly a function of the size of the incoming/outgoing message
3. Message Authentication Code (HMAC/CMAC) check/calculation: mostly a function of the size of the incoming/outgoing message.
4. MAC state machine processing: This depends on the type of MAC Management message that is received and the type of information that it contains
5. Software architecture and order of operations: As mentioned earlier, some MSs may benefit from not having to decode other messages while processing a particular message. In this case it is desirable for the BS to create "silence intervals" to expedite the processing time at the MS. The MS needs to indicate to the BS weather that is a factor and if the provided estimates assume such behavior from the BS.

The provided information can be used by the BS in a number of different ways:

1. Use the provided processing estimates to provide uplink bandwidth allocation at the time indicated by the processing time. If the MS has indicated that silence intervals can help expedite processing, the BS should make sure the MS will not have to decode other in-coming messages in between (see FIG. 3). If silence intervals are not beneficial to the MS, the BS may decide to not impose them (see FIG. 4 for example).
2. Use the provided processing estimates for comparison purposes only (i.e. determine which among the MSs connected to it are the fastest) and schedule uplink bandwidth for the fastest MSs more often or earlier than the slower ones.

When providing the description of its processing capabilities the MS can also indicate how this information should be used by the BS (case 1 or 2 above).

In a preferred embodiment, the MS sends its processing capability in an optional TLV field which can be included in any MAC Management message. It is desirable to include this TLV in the management messages that appear early in the network entry procedure, the earliest being the Ranging Request (RNG_REQ) message. At least one specific processing capability parameter is included in the RNG-REQ message when the MS attempts to perform network entry or network re-entry and the MS wants to indicate to the BS the time it needs to process incoming MAC Management messages and generate the next uplink MAC management message in the network entry process. The processing capability parameter includes a determination of network entry management message processing capabilities and processing delays. Table 1 shows a specific message encoding which can be included in any MAC Management Message

TABLE 1

| Name | Type (1 byte) | Length | Value (variable-length) |
|---|---|---|---|
| Network Entry Management Message Processing Delays | XX | variable | Compound TLV to specify time needed to process incoming MAC Management messages and generate next uplink message during network entry |

More specifically, Table 2 shows compound TLV components of the network entry management message processing delays.

TABLE 2

| Name | Type (1 byte) | Length | Value (variable-length) |
|---|---|---|---|
| Flags | 1 | 1 | Bit #0: A value of 1 indicates that the provided estimates should be used by BS to determine and/or preemptively allocate uplink bandwidth for next in sequence uplink MAC management message. A value of 0 indicates that the provided estimates represent max delays. Bit #1: A value of 1 indicates that the response time to an incoming management message can be decreased when the MS does not have to decode other MAC management messages while processing the incoming message. Bit #2-Bit #7: Reserved, should be set to 0 |
| FEC Processing Delays | 2 | 3-15 | First two bytes are flags indicating for which DIUC codes processing estimates are included. Bit#0-Bit#12: If bit # N is set to 1, then an estimate of the processing time required for the FEC described by DIUC = N is included. Bit#13-Bit#15: Reserved, should be set to 0 The first two bytes are followed by a number of bytes equal to the number of bits that are set to 1 in the first two bytes. Each of these bytes indicates processing time for the corresponding DIUC in units bytes per millisecond. The processing delay bytes should be listed in order of acceding DIUC code, omitting the DIUC codes for which the corresponding flag is set to 0 in the flag bytes. |
| CRC processing Delays | 3 | 1 | Time required for CRC check as a function of the size (in bytes) of the incoming MAC Management message. In units of bytes per millisecond. |
| HMAC/CMAC Delays | 4 | 1 | Time required to check the HMAC/CMAC tuple as a function of the size of the incoming MAC Management message. In units of bytes per millisecond. |
| MAC Layer Processing Delays | 5 | 3-12 | First two bytes are flags indicating the type of incoming MAC management messages for which response time estimates are included. Bit #0: respond to RNG_RSP (status "continue") Bit #1: respond to RNG_RSP (status "success") Bit #2: respond to PKM_RSP encapsulating EAP message Bit #3: respond to PKM_RSP containing SA Challenge Bit #4: respond to PKM_RSP containing SA-TEK-Response Bit #5: respond to REG_RSP Bit #6: respond to DSA_RSP/DSC_RSP Bit #7: respond to DSA_REQ/DSC_REQ Bit #8: respond to MOB_BSHO_REQ/RSP with MOB_HO_IND Bit #9-Bit#15: Reserved, should be set to 0 The actual response delay estimates are included in the form of a number of bytes that follow the first two bytes. Each delay estimate is one-byte long and the units are equal to the duration of one OFDMA symbol. Response delay estimates are only provided for those messages identified by the bits set to 1 in the first two bytes. The bytes containing the delay estimates appear in the same order as the corresponding flag bits in the first two bytes. For all the indicated messages, the MS can use information it has obtained (e.g. from Handover Optimization TLVs) about messages that can be skipped during a network entry process in order to determine what messages it will generate as a response and what the associated delay will be. |

The processing time estimates are provided under the assumption that the burst that contains the incoming MAC management message does not contain any other messages (for this or for other MSs). The total time required by an MS to respond to an incoming message may be calculated by the BS by combining the delays described by all the included TLVs. The starting time should be the end of the burst that carries the management message to which the MS responds.

When a TLV is not included then the processing time described by that TLV should not be taken into account.

If bit #0 of the flags TLV is set to 1, then the provided estimates also include the time required by the MS to prepare the next uplink MAC Management Message in the network entry sequence, and the total delay can be used by the BS to determine the time that an uplink bandwidth allocation will be needed by the MS.

When sending the RNG_REQ MAC Management Message, the MS may include a Network Entry Management Message Processing Delays TLV in order to indicate to the BS how fast it can process incoming MAC Management Messages. This MS can include this TLV in other MAC Management messages also, preferably messages that appear early in the network entry/re-entry process. If an MS has sent a Network Entry Management Message Processing Delays with bit#0 in the flags portion (see Table 2) set to 1, then the BS, when it sends a MAC Management Message to the MS during the network entry process, can use the specified delays to estimate when the MS will have processed the message and be ready to continue with the next message in the network entry process.

Furthermore, when bit#1 in the flags portion (see Table 2) of the Network Entry Management Message Processing Delays TLV is set to 1, the BS can expedite the processing of incoming MAC management messages at the MS, by making sure that the MS is not disturbed (i.e. does not need to decode other messages) while processing the incoming message. We refer to the periods of time that the MS is kept undisturbed by the BS as silence intervals. Regardless of weather bit #1 in the Network Entry Management Message Processing Delays TLV is set to 1 or not, the BS can impose silence intervals at its own discretion.

Figure 6:
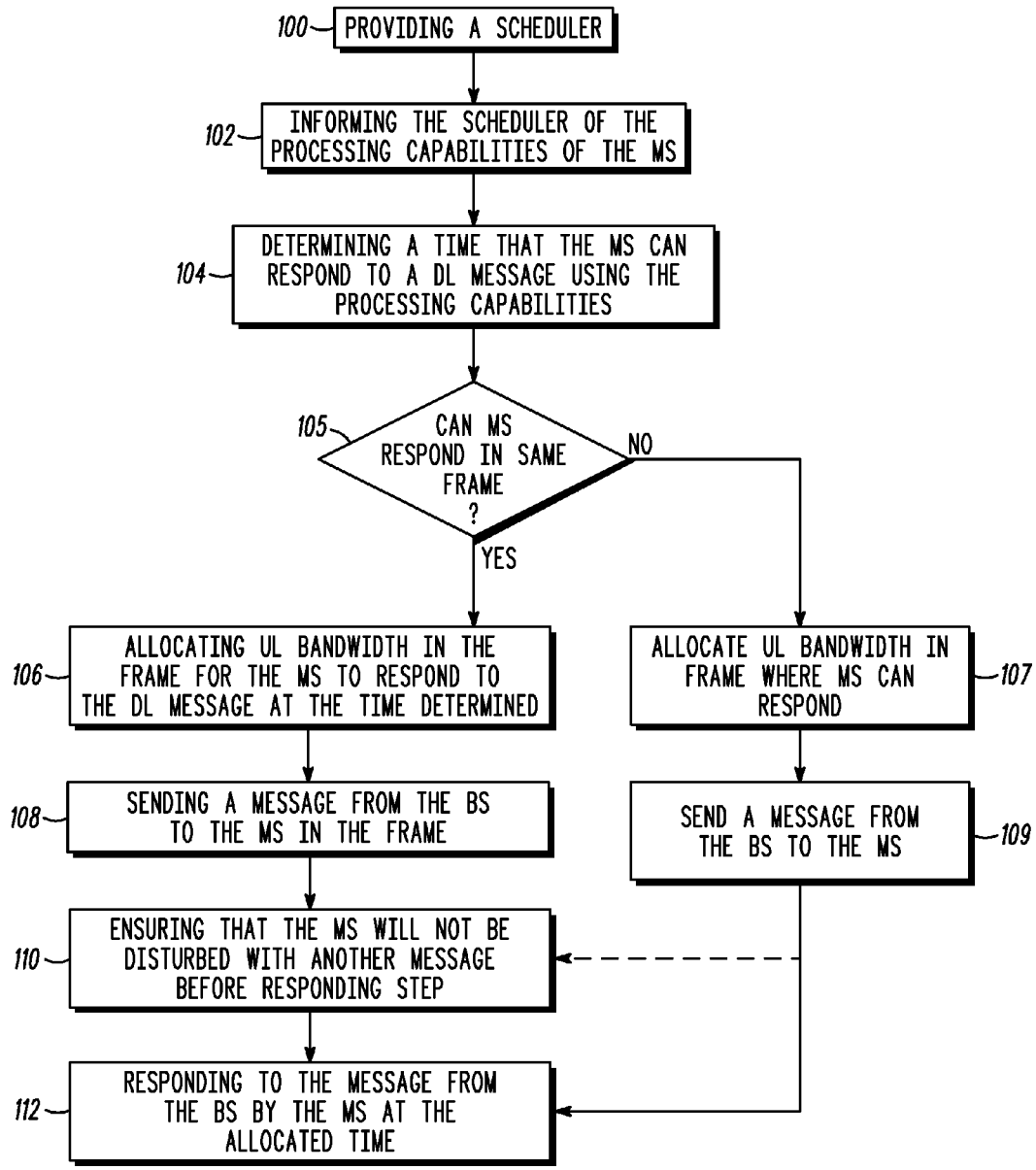
FIG. 6 shows a simplified flow chart, in accordance with the present invention.

Referring to FIG. 6, the present invention specifically includes a method for fast acquisition of a wireless broadband communication link in a communication system between a mobile station and a base station. The method includes a first step 100 of providing a scheduler. A next step 102 includes informing the scheduler of the processing capabilities of the mobile station, by adding an optional field to an existing control message, such as a TLV field attached to a Media Access Control management message indicating the processing capability of the mobile station.

In a first embodiment, a next step 104 includes determining, by the scheduler, a time that the mobile station can respond to a downlink message, either in the same frame or subsequent frame, using the processing capabilities from the informing step 102. This step can include determining at least on of: an earliest time that the MS can respond, an exact time that the MS can respond, and/or a maximum time that the MS can respond. A determination is then made 105 as to whether the mobile station is capable of responding to a message within the duration of one frame.

If the MS can respond within the same frame, a next step includes allocating 106, by the scheduler, uplink bandwidth in the selected frame for the mobile station to respond to the downlink message at the time determined in the determining step 104. Otherwise, the scheduler allocates uplink bandwidth in the determined frame for the mobile station to respond to the downlink message at the time determined in the determining step 104.

A next step includes sending 108, 109 a message from the base station to the mobile station in a first frame.

In a second embodiment, if the MS can respond within the same frame, a next step includes ensuring 110 that the mobile station will not be disturbed with another message before the responding step, such that the mobile station can respond to the downlink message within the determined time. Specifically, this step includes ensuring that there are no other messages scheduled for the mobile station until the determined time from the determining step 104. This step is optional if the MS could not respond within the same frame, since the MS may be able to respond in a next frame, even with some interruption.

A next step includes responding 112 to the message from the base station by the mobile station at the allocated time, either before the end of the same frame if the MS is able to, or during a subsequent frame if the MS does not have sufficient processing capabilities.

Preferably, the sending step 108 occurs as early as possible within a single frame and the responding step 112 occurs as late as is required within the single frame for the mobile station to properly respond to the downlink message, wherein the determining step 104 includes the scheduler providing sufficient time for the mobile station to process the downlink message, given the mobile station processing capabilities, between the sending 108 and responding steps 112.

The proposed method as described above will result in significant gains in terms of network entry and handover delays for Mobiles that are capable of processing incoming messages in less time than a single frame duration. This is especially true for systems where a large frame duration is chosen (frame duration can range from two milliseconds to twenty milliseconds in 802.16e).

Figure 5:
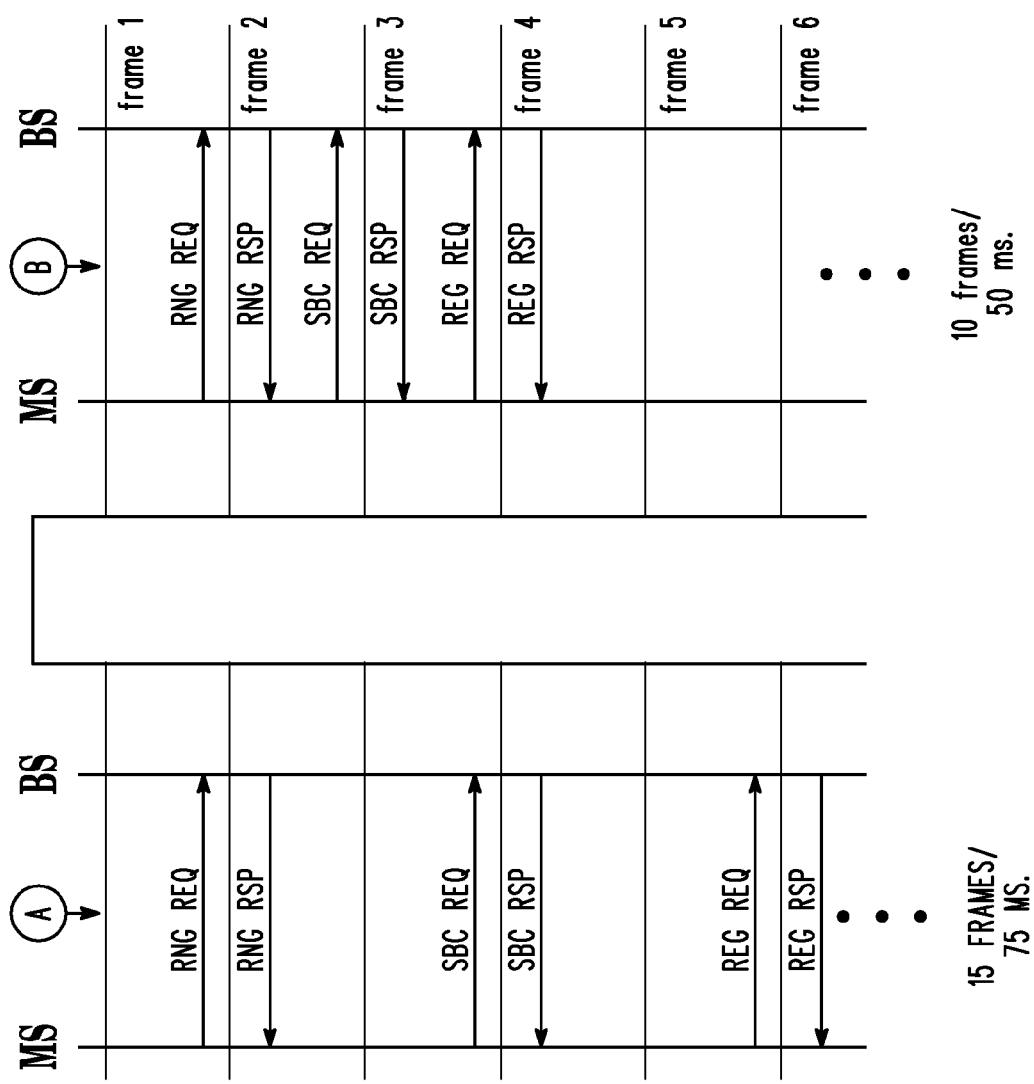
FIG. 5 shows a simplified timing diagram comparing the benefits of the present invention of FIG. 3 against the prior art.

Referring to FIG. 5, the present invention allows for the exchange of a pair of messages to be completed within one frame instead of two or more, thus speeding up the network entry process. Using the prior art process of Step A, where a pair of message exchanges takes two frames or more (two frames shown in the example in FIG. 5), an entry or handover of a MS can take up to fifteen frames. Using the present invention process of Step B, where a pair of message exchanges takes up one frame, an entry or handover of a MS can take up to only ten frames. Based on delay-analysis studies, the present invention can reduce the network entry delay by the equivalent of five frame durations, which is equal to twenty-five milliseconds for a typical duration of five milliseconds.

As a result, the present invention can provide a 33% improvement in terms of handover delay, and, more importantly, it can reduce the handover delay to a number below the fifty millisecond delay budget threshold that is typically required for full mobility applications. The resulting gains from using the invention increase as the number of messages that need to be exchanged increase.

Even for mobiles that are not fast enough to reply within the same frame, the BS can make a more accurate prediction or determination and allocate uplink bandwidth when (in which frame, and where in that frame) the MS needs it, instead of some "blind" allocation, which may come too early or too late. Preferably, the best case is to allow a response within the same frame, but even if that is not possible the present invention will still provide a processing time gain.

In addition, even if the mobiles do not provide accurate response time estimates but only minimum or maximum values (in which case the response times cannot be used to calculate the exact time that the uplink bandwidth will be needed), the present invention still has benefits because the scheduler can now rank the users in order of processing speed, based on the numbers each provided for minimum or maximum response time, and simply allocate UL bandwidth to faster users more often or earlier. These are still "blind" allocations, in the sense that the BS does not know exactly when a response will be ready, but these allocations have a higher chance of being useful (i.e. faster MSs are likely to respond faster).

The present invention as described above applies to wireless broadband communication systems. Although the examples of the present invention as used herein are specifically directed to IEEE 802.16e, it should be recognized that the present invention could be beneficially applied to other wireless broadband communication systems, including cellular communication systems, with appropriate modifications.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for fast acquisition of a communication link in a communication system between a mobile station and a base station, the method comprising the steps of:
   providing a scheduler;
   informing the scheduler of the processing capabilities of the mobile station;
   determining a time that the mobile station can respond to a downlink message using the processing capabilities from the informing step;
   allocating uplink bandwidth for the mobile station to respond to the downlink message at the time determined in the determining step;
   sending a message from the base station to the mobile station; and
   responding to the message from the base station by the mobile station at the allocated time, wherein the sending and responding steps occur within a same frame.

2. The method of claim 1, wherein whenever a downlink message is scheduled during the sending step, the allocating steps allocates uplink bandwidth within the same frame.

3. The method of claim 1, wherein the sending step occurs as early as possible within a single frame and the responding step occurs as late as is required within the single frame for the mobile station to properly respond to the downlink message, and wherein the determining step includes the scheduler providing sufficient time for the mobile station to process the downlink message, given the mobile station processing capabilities, between the sending and responding steps.

4. The method of claim 1, further comprising the step of ensuring that the mobile station will not be disturbed with another message before the responding step, such that the mobile station can respond to the downlink message within the determined time.

5. The method of claim 4, wherein the ensuring step includes ensuring that there are no other messages scheduled for the mobile station until the determined time from the determining step.

6. The method of claim 1, wherein the informing step includes the mobile station informing the base station of its processing capabilities by adding an optional field to an existing control message.

7. The method of claim 6, wherein the optional field is a TLV field attached to a Media Access Control management message indicating the processing capability of the mobile station.

8. A method for fast acquisition of a wireless broadband communication link in a communication system between a mobile station and a base station, the method comprising the steps of:
   providing a scheduler;
   informing the scheduler of the processing capabilities of the mobile station;
   determining, by the scheduler, an earliest time in a selected frame that the mobile station can respond to a downlink message in the same frame using the processing capabilities from the informing step;
   allocating, by the scheduler, uplink bandwidth in the selected frame for the mobile station to respond to the downlink message at the time determined in the determining step;
   sending a message from the base station to the mobile station in the frame; and
   responding to the message from the base station by the mobile station at the allocated time before the end of the same frame.

9. The method of claim 8, wherein the determining step includes first determining whether the mobile station is capable of responding to a message within the duration of one frame.

10. The method of claim 8, wherein the sending step occurs as early as possible within a single frame and the responding step occurs as late as is required within the single frame for the mobile station to properly respond to the downlink message, and wherein the determining step includes the scheduler providing sufficient time for the mobile station to process the downlink message, given the mobile station processing capabilities, between the sending and responding steps.

11. The method of claim 8, further comprising the step of ensuring that the mobile station will not be disturbed with another message before the responding step, such that the mobile station can respond to the downlink message within the determined time.

12. The method of claim 11, wherein the ensuring step includes ensuring that there are no other messages scheduled for the mobile station until the determined time from the determining step.

13. The method of claim 8, wherein the informing step includes the mobile station informing the base station of its processing capabilities by adding an optional field to an existing control message.

14. The method of claim 13, wherein the optional field is a TLV field attached to a Media Access Control management message indicating the processing capability of the mobile station.

15. A communication system for fast acquisition of a wireless broadband communication link in a communication system between a mobile station and a base station, the communication system comprising:
- information indicating the processing capabilities of the mobile station; and
- a scheduler operable to receive the information and determine a time in a selected frame that the mobile station can respond to a downlink message in the same frame, the scheduler allocates uplink bandwidth in the selected frame for the mobile station to respond to the downlink message at the determined time, wherein
- when a message is sent from the base station to the mobile station in the frame, the mobile station can respond to the message at the allocated time before the end of the same frame.

16. The system of claim 15, wherein the scheduler operates to ensure that the mobile station will not be disturbed with another scheduled message before the mobile station can respond, such that the mobile station can respond to the downlink message within the determined time.

17. The system of claim 15, wherein the scheduler is operable to receive the informing of the processing capabilities of the mobile station by reading an optional field attached to an existing control message.

18. The system of claim 17, wherein the optional field is a TLV field attached to a Media Access Control management message indicating the processing capability of the mobile station.

* * * * *